(12) United States Patent
Tsuboi et al.

(10) Patent No.: US 8,797,385 B2
(45) Date of Patent: Aug. 5, 2014

(54) ROBOT DEVICE AND METHOD OF CONTROLLING ROBOT DEVICE

(75) Inventors: Toshimitsu Tsuboi, Tokyo (JP); Kenta Kawamoto, Tokyo (JP); Yasunori Kawanami, Tokyo (JP); Atsushi Miyamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 383 days.

(21) Appl. No.: 13/070,066

(22) Filed: Mar. 23, 2011

(65) Prior Publication Data
US 2011/0234758 A1 Sep. 29, 2011

(30) Foreign Application Priority Data

Mar. 29, 2010 (JP) ................................. 2010-075334

(51) Int. Cl.
*H04N 13/02* (2006.01)
(52) U.S. Cl.
USPC ............................................................ 348/46
(58) Field of Classification Search
USPC .................................................. 348/40–161
See application file for complete search history.

(56) References Cited

U.S. PATENT DOCUMENTS

| | | | |
|---|---|---|---|
| 6,661,461 B1 * | 12/2003 | Watanabe et al. | 348/370 |
| 6,668,075 B1 * | 12/2003 | Nakamura et al. | 382/144 |
| 7,040,153 B2 * | 5/2006 | Kroll et al. | 73/146 |
| 7,257,236 B2 * | 8/2007 | Yukhin et al. | 382/103 |
| 7,547,129 B2 * | 6/2009 | Uehara et al. | 362/607 |
| 7,634,107 B2 * | 12/2009 | Fujii | 382/103 |
| 7,672,503 B2 * | 3/2010 | Morisada et al. | 382/153 |
| 7,865,267 B2 * | 1/2011 | Sabe et al. | 700/245 |
| 2002/0071279 A1 * | 6/2002 | Katogi et al. | 362/317 |
| 2004/0125205 A1 * | 7/2004 | Geng | 348/142 |
| 2006/0064202 A1 * | 3/2006 | Gutmann et al. | 700/245 |
| 2008/0215184 A1 * | 9/2008 | Choi et al. | 700/259 |
| 2009/0262189 A1 * | 10/2009 | Marman | 348/143 |
| 2010/0053319 A1 * | 3/2010 | Sakai et al. | 348/125 |
| 2010/0066823 A1 * | 3/2010 | Westphal et al. | 348/79 |
| 2010/0150409 A1 * | 6/2010 | Ferguson | 382/118 |
| 2010/0235040 A1 * | 9/2010 | Iwai et al. | 701/29 |
| 2010/0295946 A1 * | 11/2010 | Reed et al. | 348/164 |
| 2011/0012746 A1 * | 1/2011 | Fish et al. | 340/691.6 |
| 2011/0080490 A1 * | 4/2011 | Clarkson et al. | 348/222.1 |
| 2011/0261178 A1 * | 10/2011 | Lo et al. | 348/68 |
| 2013/0103194 A1 * | 4/2013 | Jones et al. | 700/245 |

FOREIGN PATENT DOCUMENTS

JP 2009-270915 11/2009

\* cited by examiner

*Primary Examiner* — Joseph Ustaris
*Assistant Examiner* — Talha Nawaz
(74) *Attorney, Agent, or Firm* — Sony Corporation

(57) ABSTRACT

There is provided a robot device including an irradiation unit that irradiates pattern light to an external environment, an imaging unit that acquires an image by imaging the external environment, an external environment recognition unit that recognizes the external environment, an irradiation determining unit that controls the irradiation unit to be turned on when it is determined that irradiation of the pattern light is necessary based on an acquisition status of the image, and a light-off determining unit that controls the irradiation unit to be turned off when it is determined that irradiation of the pattern light is unnecessary or that irradiation of the pattern light is necessary to be forcibly stopped, based on the external environment.

14 Claims, 6 Drawing Sheets

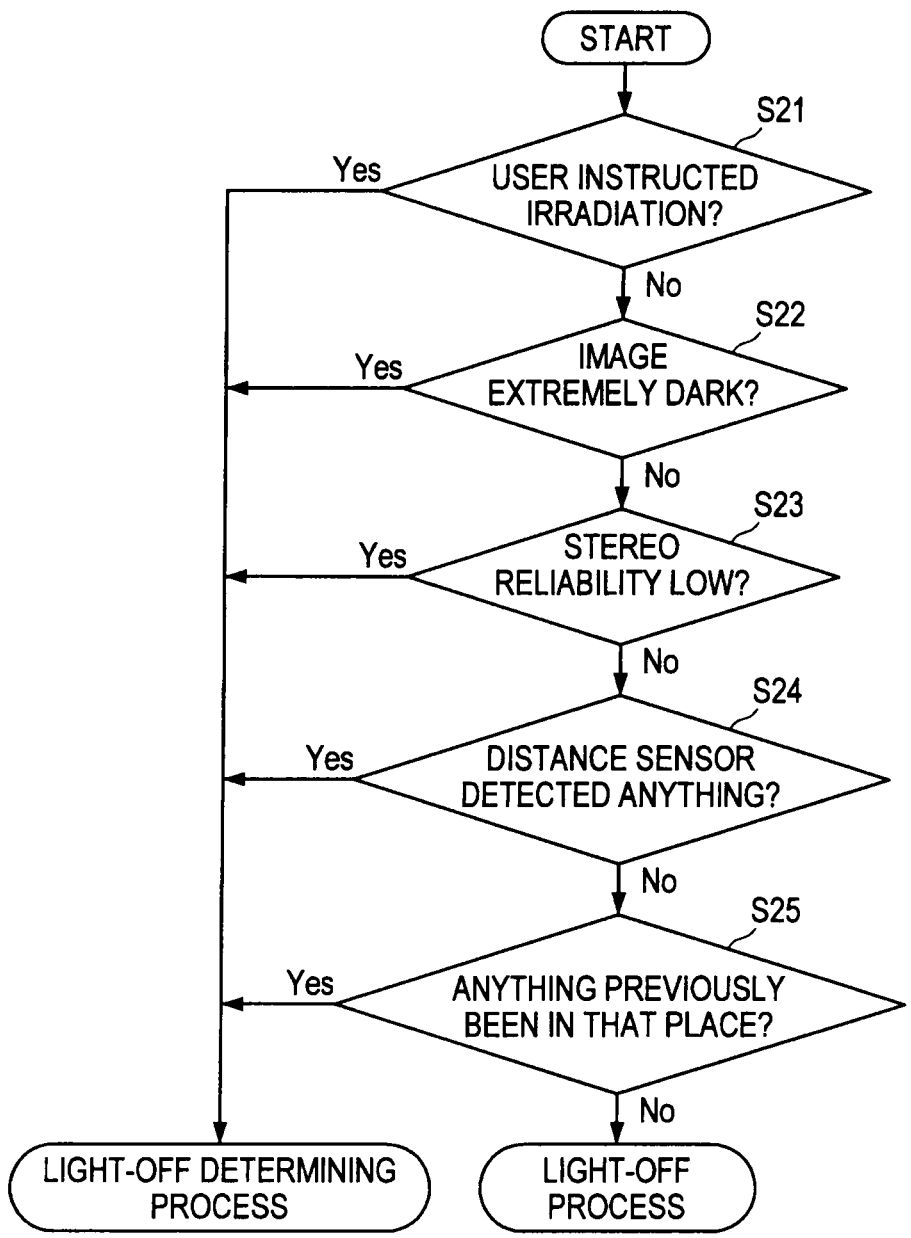

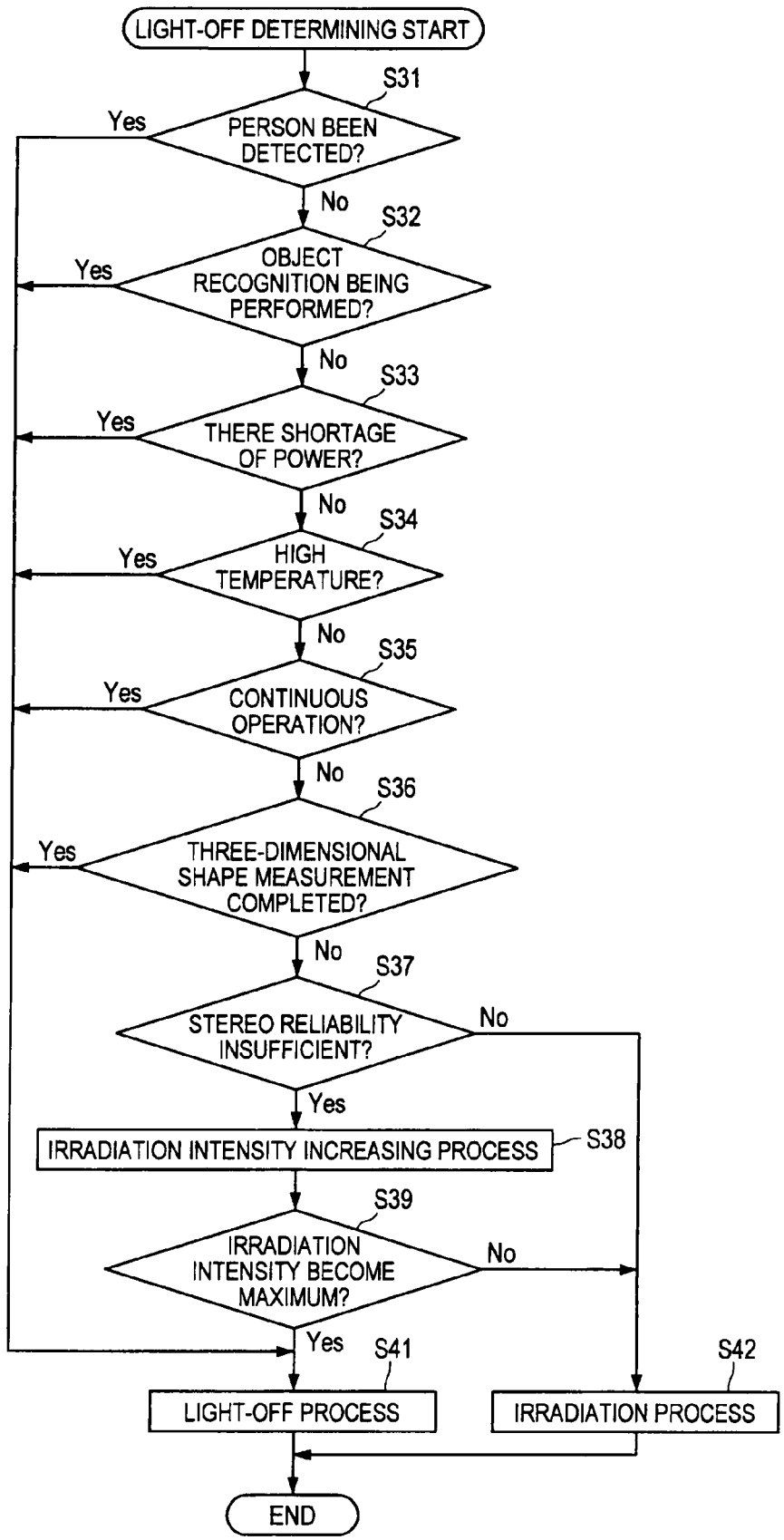

ROBOT DEVICE AND METHOD OF CONTROLLING ROBOT DEVICE

BACKGROUND OF THE INVENTION

1. Field of the Invention

The present invention relates to a robot device and a method of controlling a robot device.

2. Description of the Related Art

A three-dimensional measurement device acquires a three-dimensional shape or position of a target object using a stereo camera. However, when a surface of the target object is black or white and is uniform with no pattern, there is an issue in that the actual shape or position of the target object cannot be recognized as is. For example, when a paper of a white background is put on a wall, a recognition result that the wall has a hole may be obtained. For this reason, there is a technique of accurately detecting the shape or position of an unpatterned target object by irradiating pattern light with a pattern to the target object.

For example, Japanese Patent Application Laid-Open (JP-A) No. 2009-270915 discloses a technique using two projection patterns in order to acquire a three-dimensional shape of high resolution at a high speed.

SUMMARY OF THE INVENTION

Meanwhile, in order to enable a robot device that autonomously moves to recognize an external environment, the above-described three-dimensional measurement device may be used. In this case, in order to recognize the accurate shape or position of the target object, the robot device moves or acts while irradiating pattern light. However, in the robot device that is usually used in a place where a person is near, for example, at a home, if the pattern light is constantly irradiated, there is an issue in that it is too bright, and a pattern of pattern light projected to the target object is bothersome and risky.

Further, unlike a device specialized for three-dimensional measurement, the robot device not only recognizes the shape or position of the target object through three-dimensional measurement but also performs object recognition for recognizing a texture or color of the target object. At this time, if the robot device constantly irradiates the pattern light, there is an issue in that the texture or color of the target object cannot be recognized.

In light of the foregoing, it is desirable to provide a robot device and a method of controlling a robot device, which are novel and improved, and in which turning on or off pattern light for three-dimensional measurement can be appropriately switched according to the situation.

According to an embodiment of the present invention, there is provided a robot device including an irradiation unit that irradiates pattern light to an external environment, an imaging unit that acquires an image by imaging the external environment, an external environment recognition unit that recognizes the external environment, an irradiation determining unit that controls the irradiation unit to be turned on when it is determined that irradiation of the pattern light is necessary based on an acquisition status of the image, and a light-off determining unit that controls the irradiation unit to be turned off when it is determined that irradiation of the pattern light is unnecessary or that irradiation of the pattern light is necessary to be forcibly stopped, based on the external environment.

The robot device may further include a person detection unit that detects a person from the external environment. The light-off determining unit may control to turn off irradiation of the pattern light from the irradiation unit when the person has been detected.

The light-off determining unit may control the irradiation unit to be turned off when it is determined that irradiation of the pattern light is unnecessary or that irradiation of the pattern light is necessary to be forcibly stopped, based on an inside status.

The robot device may further include an object recognition unit that recognizes a texture or color of an object from the external environment. The light-off determining unit may control to turn off irradiation of the pattern light from the irradiation unit when the texture or color of the object has been recognized from the external environment.

The light-off determining unit may control the irradiation unit to be turned off when it is determined that irradiation of the pattern light is unnecessary or that irradiation of the pattern light is necessary to be forcibly stopped, based on power consumption of a battery, a temperature of the irradiation unit, or a continuous operation time of the irradiation unit.

The light-off determining unit may control the irradiation unit to be turned off when it is determined that irradiation of the pattern light is unnecessary or that irradiation of the pattern light is necessary to be forcibly stopped, based on the acquisition status of the image.

The light-off determining unit may control the irradiation unit to be turned on when it is determined that irradiation of the pattern light is necessary based on the acquisition status of the image.

The robot device may further include a storage unit that stores a shape or position of a target object recognized based on the image. The light-off determining unit may control the irradiation unit to be turned on when it is determined that irradiation of the pattern light is necessary based on the shape or position of the target object stored in the storage unit.

According to another embodiment of the present invention, there is provided a method of controlling a robot device, including the steps of irradiating, by an irradiation unit, pattern light to an external environment, acquiring, by an imaging unit, an image by imaging the external environment, recognizing, by an external environment recognition unit, the external environment, controlling, by an irradiation determining unit, the irradiation unit to be turned on when it is determined that irradiation of the pattern light is necessary based on an acquisition status of the image, and controlling, by a light-off determining unit, the irradiation unit to be turned off when it is determined that irradiation of the pattern light is unnecessary or that irradiation of the pattern light is necessary to be forcibly stopped, based on the external environment.

According to the present invention, turning pattern light for three-dimensional measurement on or off can be appropriately switched according to the situation.

BRIEF DESCRIPTION OF THE DRAWINGS

FIG. 5 is a flowchart illustrating an irradiation determining process on pattern light of the robot according to the same embodiment.

FIG. 6 is a flowchart illustrating a light-off determining process and adjustment of the irradiation intensity on pattern light of the robot according to the same embodiment.

DETAILED DESCRIPTION OF THE EMBODIMENT(S)

Figure 1:
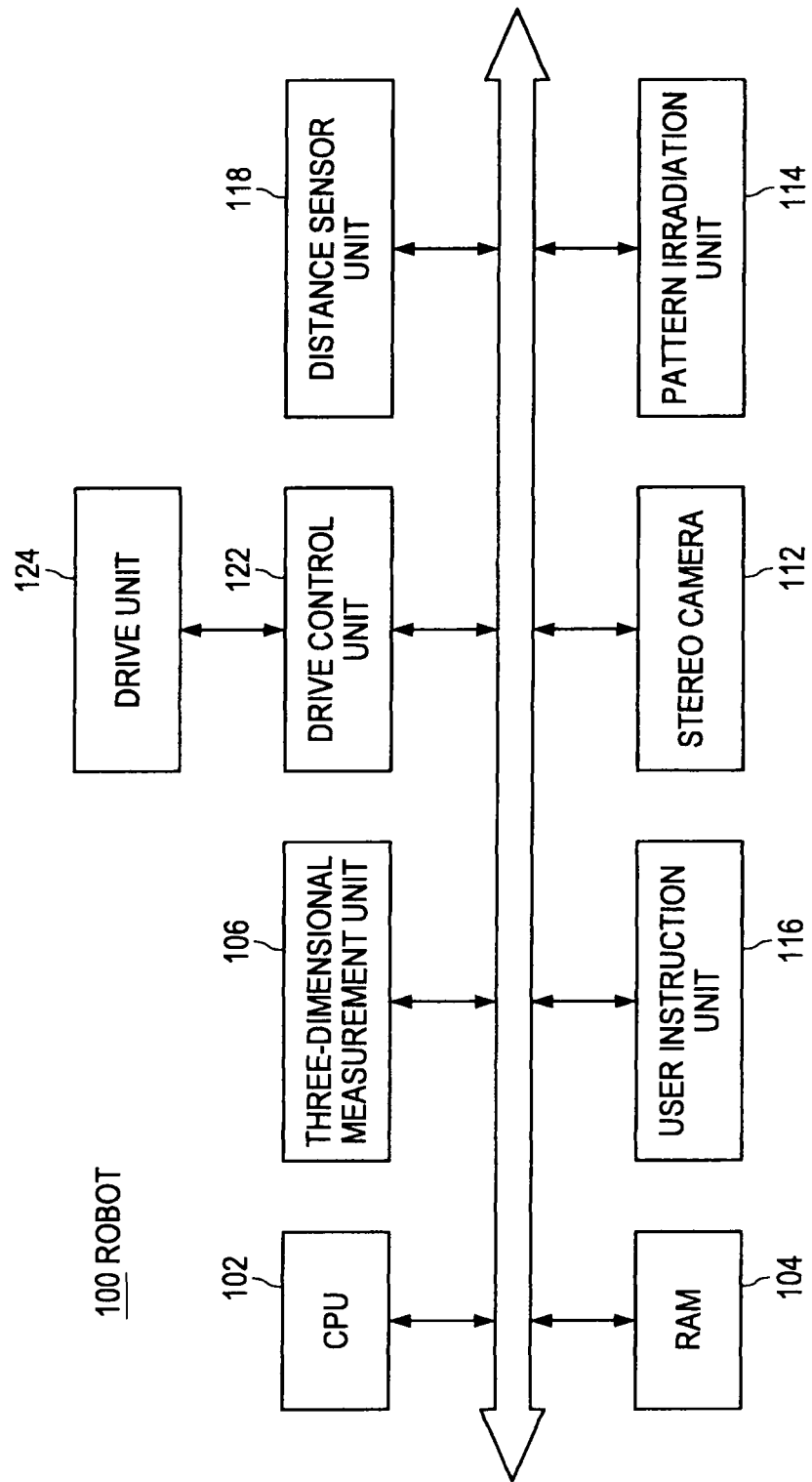
FIG. 1 is a block diagram illustrating a robot according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, a description will be made in the following order:
1. A configuration of an embodiment
2. An operation of an embodiment.

<1. A Configuration of an Embodiment>

First, a configuration of a robot 100 according to an embodiment of the present invention will be described. FIG. 1 is a block diagram illustrating the robot 100 according to the present embodiment.

The robot 100 recognizes an external environment and autonomously performs movement corresponding to the environment or an action for a user. The robot 100 includes a three-dimensional measurement unit 106, and acquires a three-dimensional shape or position of a target object and recognizes the external environment. The robot 100 can accurately detect a shape or position of an unpatterned target object by irradiating pattern light with a pattern to the target object. The robot 100 can appropriately switch turning on or off the pattern light according to the situation. Thus, even when the robot 100 is used in a place where a person is near, for example, at a home, safety can be secured.

The robot 100 includes, for example, a central processing unit (CPU) 102, a random access memory (RAM) 104, the three-dimensional measurement unit 106, a stereo camera 112, a pattern irradiation unit 114, a user instruction unit 116, a distance sensor unit 118, a drive control unit 122, and a drive unit 124 as illustrated in FIG. 1.

The CPU 102 is a control device and an arithmetic device. The CPU 102 controls each of the components of the robot 100 and executes a program. The RAM 104 is a storage device. A program or various data is recorded in the RAM 104, and the program or various data is read out from the RAM 104 as necessary.

The three-dimensional measurement unit 106 measures a three-dimensional shape or position of the target object based on image data obtained by imaging the external environment by the stereo camera 112. For three-dimensional measurement, a general technique may be employed, and thus a detailed description thereof is omitted in this disclosure.

Figure 3:
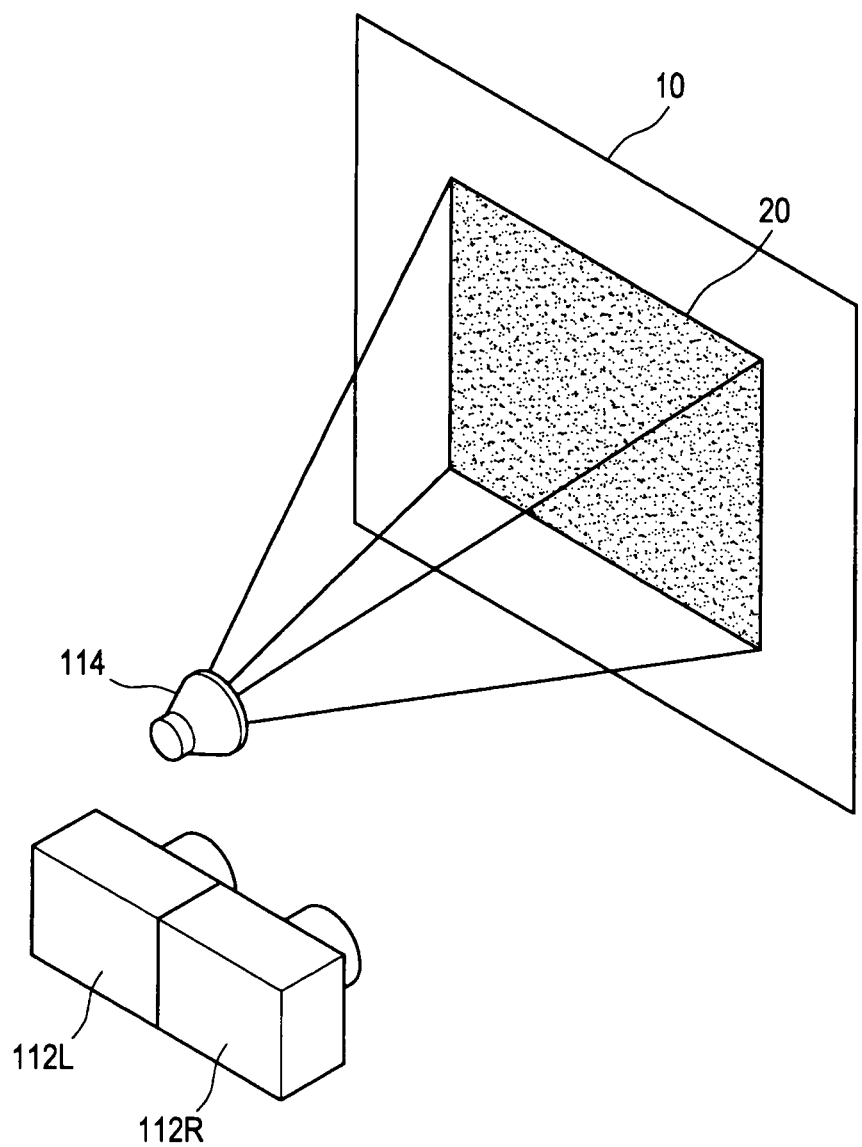
FIG. 3 is an explanation diagram illustrating an arrangement of a stereo camera and a status in which pattern light is projected by a pattern irradiation unit.

The stereo camera 112 includes two cameras 112L and 112R that are horizontally disposed as illustrated in FIG. 3. FIG. 3 is an explanation diagram illustrating an arrangement of the stereo camera 112 and a status in which pattern light is projected by the pattern irradiation unit 114. The stereo camera 112 takes an image of the external environment of the robot 100 and acquires image data. The acquired image data is used for three-dimensional measurement in the three-dimensional measurement unit 106.

The pattern irradiation unit 114 irradiates pattern light toward a subject (a target object) to be imaged by the stereo camera 112 as illustrated in FIG. 3. By irradiating the pattern light, a pattern 20 is projected to an unpatterned target object 10, so that even the three-dimensional shape or position of the unpatterned target object 10 can be recognized.

The user instruction unit 16 is operated by a user to generate an operation signal. The user instruction unit 116 transmits the generated operation signal to the CPU 102 and the like. For example, an instruction to turn the pattern irradiation unit 114 on or off is input to the user instruction unit 116. For example, the operation signal is transmitted from the user instruction unit 116 to an irradiation determining unit 142 as illustrated in FIG. 2.

The distance sensor unit 118 is a sensor that is installed separately from the stereo camera 112 and measures a distance from the target object. The distance obtained by the distance sensor unit 118 is used to confirm whether or not the target object is present or to improve a degree of accuracy of three-dimensional measurement.

The drive unit 124 enables the robot 100 to move or act. The drive unit 124 is controlled by the drive control unit 122, and drives based on a signal autonomously generated by the robot 100 itself or a signal generated by the user's operation.

Figure 2:
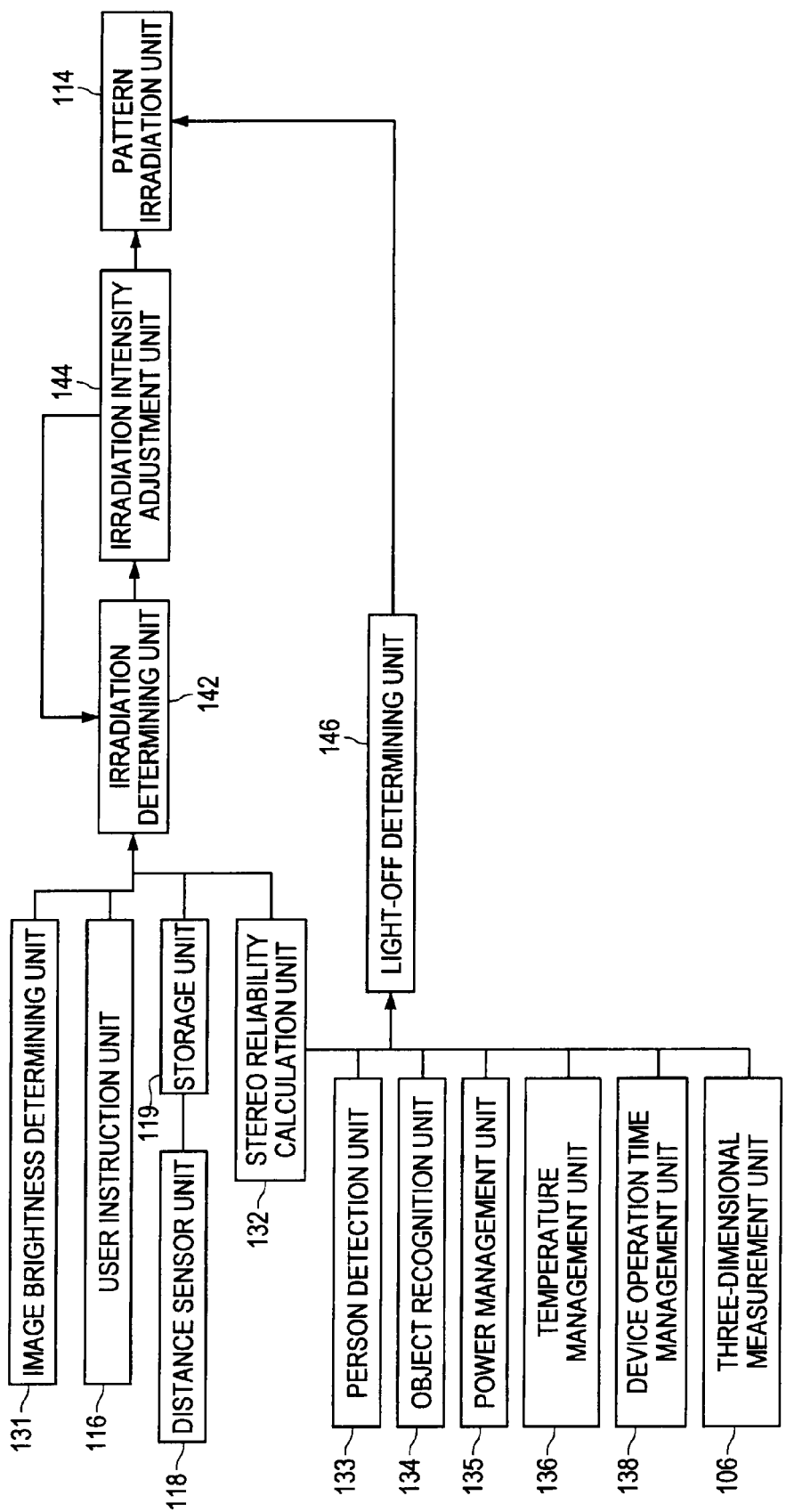
FIG. 2 is a block diagram illustrating a detailed configuration of the robot according to the same embodiment.

The robot 100 further includes, for example, a storage unit 119, an image brightness determining unit 131, a stereo reliability calculation unit 132, a person detection unit 133, an object recognition unit 134, a power management unit 135, a temperature management unit 136, a device operation time management unit 138, the irradiation determining unit 142, an irradiation intensity adjustment unit 144, and a light-off determining unit 146 as illustrated in FIG. 2. FIG. 2 is a block diagram illustrating a detailed configuration of the robot 100 according to the present embodiment.

For example, the distance measured by the distance sensor unit 118 is recorded in the storage unit 119. The distance recorded in the storage unit 119 is transmitted to the irradiation determining unit 142.

The image brightness determining unit 131 determines a brightness level of image data obtained by imaging the external environment by the stereo camera 112. The image brightness determining unit 131 transmits the determining result to the irradiation determining unit 142.

The stereo reliability calculation unit 132 calculates the reliability of a stereo image obtained by imaging the external environment by the stereo camera 112. The stereo reliability calculation unit 132 transmits the calculated stereo reliability to the irradiation determining unit 142 and the light-off determining unit 146.

The person detection unit 133 detects a person based on an image obtained by imaging the external environment by an imaging device. A person detection process can be performed using a general technique. The person detection unit 133 transmits the detection result on whether or not a person has been detected to the light-off determining unit 146.

The object recognition unit 134 recognizes a texture or color of the target object based on the image obtained by imaging the external environment by the imaging device. Texture recognition or color recognition may be performed using a general technique. The object recognition unit 134 transmits a status on whether or not the object recognition process is being performed to the light-off determining unit 146.

The power management unit 135 manages battery power to be supplied to the robot 100. The power management unit 135 transmits information on whether or not there is a shortage of the battery power necessary for driving the robot 100 to the light-off determining unit 146.

The temperature management unit 136 measures and manages the temperature inside the pattern irradiation unit 114 or the robot 100. The temperature management unit 136 transmits information related to the temperature inside the pattern irradiation unit 114 or the robot 100 to the light-off determining unit 146.

The device operation time management unit 138 measures and manages, for example, a continuous operation time of pattern light irradiation by the pattern irradiation unit 114. The device operation time management unit 138 transmits information on the continuous operation time of the pattern light irradiation to the light-off determining unit 146.

The three-dimensional measurement unit 106 transmits information on whether or not the three-dimensional measurement has been completed to the light-off determining unit 146.

The irradiation determining unit 142 determines whether or not the irradiation intensity from the pattern irradiation unit 114 is appropriate based on information from the user instruction unit 116, the storage unit 119, the image brightness determining unit 131, or the stereo reliability calculation unit 132. Further, the irradiation determining unit 142 transmits the determining result to the irradiation intensity adjustment unit 144.

When the irradiation determining unit 142 determines that there is a shortage of the irradiation intensity, the irradiation intensity unit 144 generates a command signal for increasing the irradiation intensity. The irradiation intensity adjustment unit 144 transmits the command signal to the pattern irradiation unit 114.

The light-off determining unit 146 determines whether or not to turn off the pattern irradiation unit 114 based on information from the stereo reliability calculation unit 132, the person detection unit 133, the object recognition unit 134, the power management unit 135, the temperature management unit 136, the device operation time management unit 138, or the three-dimensional measurement unit 106.

The pattern irradiation unit 114 turns the pattern light on or off by adjusting the intensity of the pattern light based on the adjustment result of the irradiation intensity adjustment unit 144 or the determining result of the light-off determining unit 146.

<2. An Operation of an Embodiment>

Figure 4:
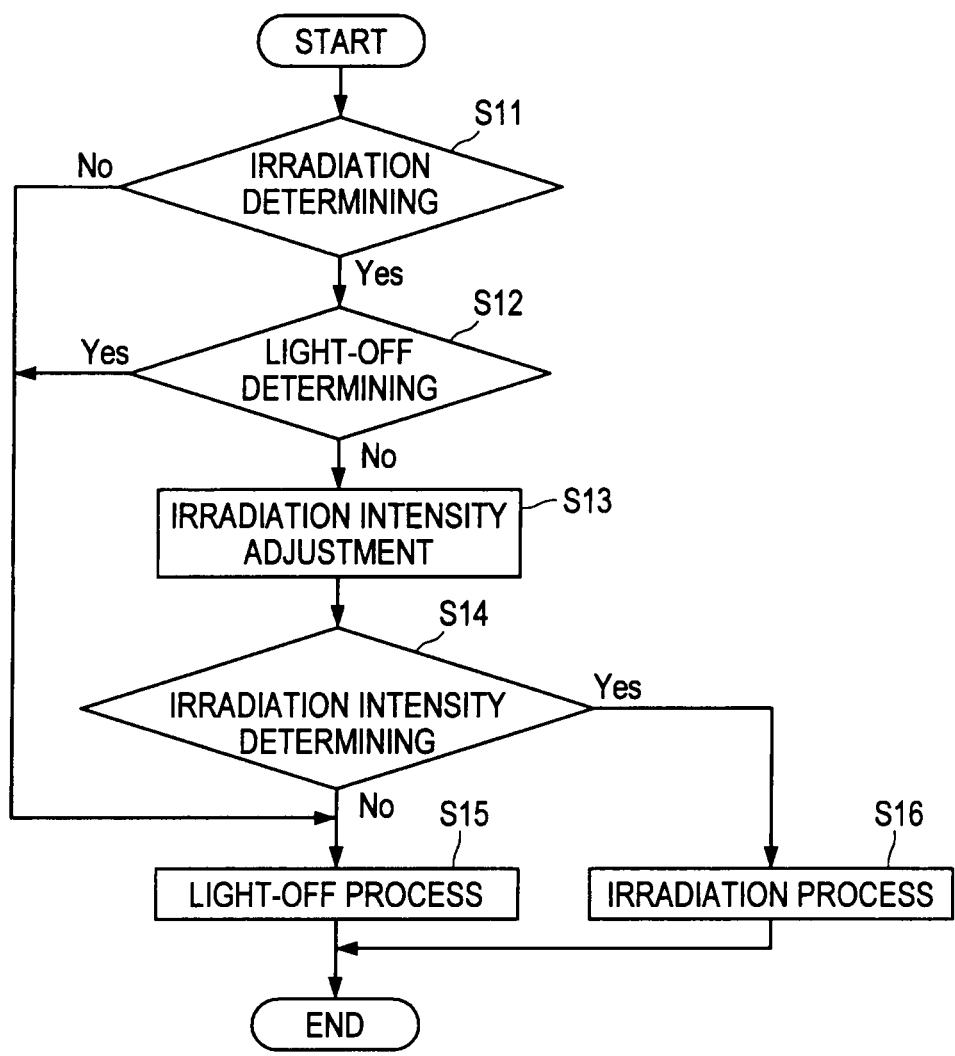
FIG. 4 is a flowchart illustrating an irradiation operation or a light-off operation of the robot according to the same embodiment.

Next, an overall overview flow on an irradiation operation or a light-off operation of the robot 100 according to an embodiment of the present invention will be described with reference to FIG. 4. FIG. 4 is a flowchart illustrating an irradiation operation or a light-off operation of the robot 100 according to the present embodiment.

First, in step S11, for three-dimensional measurement, the robot 100 performs an irradiation determining on whether or not to irradiate the pattern light toward the external environment. The irradiation determining will be described later with reference to FIG. 5.

When it is determined that the pattern light is to be irradiated, in step S12, a light-off determining on whether or not irradiation of the pattern light should be stopped or whether or not the pattern light needs to be turned off is made. The light-off determining will be described later with reference to FIG. 6. When it is determined in the light-off determining process that the pattern light need not be turned off, the pattern light is irradiated. However, when it is determined in step S11 that the pattern light should not be irradiated, it is a case in which irradiation of the pattern light is unnecessary, and in step S15, the light-off process of the pattern light is performed.

When it is determined in step S12 that the pattern light should not be turned off or that the pattern light need not be turned off, it is a case in which irradiation of the pattern light is necessary, and in step S13, the irradiation intensity is adjusted. The irradiation intensity will be described later with reference to FIG. 6. When it is determined in step S12 that the pattern light should be turned off or the pattern light need to be turned off, it is a case in which the pattern light should not be irradiated or the irradiation is unnecessary, and in step S15, the light-off process of the pattern light is performed.

After adjusting the irradiation intensity of the pattern light, in step S14, it is determined whether or not the irradiation intensity is appropriate. When it is determined that the irradiation intensity is not appropriate, for example, it is a case in which the irradiation intensity becomes maximum since the target object has not been recognized, and in step S15, the light-off process of the pattern light is performed. When it is determined that the irradiation intensity has an appropriate value, it is a case in which a search for the target object to recognize the target object is being performed, and in step S16, the irradiation process of the pattern light is performed.

Next, the irradiation determining process on the pattern light of the robot 100 according to an embodiment of the present invention will be described with reference to FIG. 5. FIG. 5 is a flowchart illustrating the irradiation determining process on the pattern light of the robot 100 according to the present embodiment. FIG. 5 illustrates the irradiation determining process from the start of the irradiation operation or the light-off operation to the light-off determining process or the light-off process.

First, in step S21, it is determined whether or not a user has instructed irradiation of the pattern light. If the user has instructed irradiation of the pattern light, for example, it is a case in which the pattern light is desired to be forcibly irradiated since it is necessary to recognize the shape or position of the target object, and the process proceeds to the light-off determining process. However, when it is determined that the user has not instructed irradiation of the pattern light, there is a possibility that irradiation of the pattern light is unnecessary, and the process proceeds to step S22.

Next, in step S22, it is determined whether or not the acquired image is extremely dark. If the acquired image is extremely dark, since a subject image is not appropriately obtained, the shape or position of the target object cannot be recognized. If the acquired image is extremely dark, for example, it is a case in which the pattern light is desired to be forcibly irradiated to recognize the shape or position of the target object, and the process proceeds to the light-off determining process. However, if the acquired image is not extremely dark, there is a possibility that irradiation of the pattern light is unnecessary, and the process proceeds to step S23.

Further, in step S23, it is determined whether or not the reliability of a stereo image generated from the acquired image (hereinafter, referred to as "stereo reliability") is lower than a predetermined value. If the stereo reliability is lower than the predetermined value, a difference in shape or position between the generated stereo image and the actual target object is large, and the three-dimensional shape cannot be successfully measured. If the stereo reliability is lower than the predetermined value, it is a case in which irradiation of the pattern light is necessary, and the process proceeds to the light-off determining process. However, if the stereo reliability is higher than the predetermined value, there is a possibility that irradiation of the pattern light is unnecessary, and the process proceeds to step S24.

Further, in step S24, it is determined whether or not the distance sensor unit 118 has detected the object present in the external environment. If the distance sensor unit 118 has detected the object, there is a possibility that the three-dimensional shape or position of the target object will be recognized through the three-dimensional measurement. If the distance sensor unit 118 has detected the object present in the external environment, it is a case in which irradiation of the pattern light is necessary, and the process proceeds to the light-off process. However, when the distance sensor unit 118 has not detected the object, there is a possibility that irradiation of the pattern light is unnecessary, and the process proceeds to step S25.

Further, when the three-dimensional shape or position of the target object obtained by past three-dimensional measurement has been stored, in step S25, it is determined, based on the stored data, whether or not an object has been present in a direction in which three-dimensional measurement will be performed later. If there has previously been something in that place, there is a possibility that the three-dimensional shape or position of the target object can be recognized through three-dimensional measurement. When it is determined that there has previously been something in that place, it is a case in which irradiation of the pattern light is unnecessary, and the process proceeds to the light-off determining process. However, when it is determined that there has previously been nothing in that place, it is comprehensively determined through step S21 to step S24 that irradiation of the pattern light is unnecessary. Therefore, in this case, the process proceeds to the light-off process.

The light-off determining process and adjustment of the irradiation intensity on the pattern light of the robot 100 according to an embodiment of the present invention will be described with reference to FIG. 6. FIG. 6 is a flowchart illustrating the light-off determining process and adjustment of the irradiation intensity on the pattern light of the robot 100 according to the present embodiment.

FIG. 6 illustrates a process from the start of the light-off determining to the light-off process or a process from the start of the light-off determining to the irradiation process through adjustment of the irradiation intensity.

First, in step S31, it is determined whether or not a person has been detected in the external environment. When a person has been detected in the external environment, in step S41, the light-off process of the pattern light is performed. As a result, an issue in that a person near the robot 100 feels too bright, and a pattern of pattern light projected to the target object is bothersome and risky can be solved. Further, it is possible to improve an indoor environment or secure the safety. However, when a person has not been detected in the external environment, the process proceeds to step S32.

Next, in step S32, it is determined whether or not object recognition for not detecting the shape or position of the target object by three-dimensional measurement but detecting a texture or color of the target object is being performed. When the object recognition is being performed, in step S41, the light-off process of the pattern light is executed. As a result, an issue in that the texture or color of the target object cannot be recognized due to the pattern of the pattern light projected to the target object can be solved. Since the pattern light is irradiated only while the object recognition is not being performed, the robot 100 can accurately recognize the texture or color of the target object at the time of object recognition. However, when object recognition is not being performed, the process proceeds to step S33.

Further, in step S33, it is determined that there is a shortage of battery power necessary for driving the robot 100. When there is a shortage of battery power, in step S41, the light-off process of the pattern light is executed. As a result, even if the degree of accuracy of three-dimensional measurement deteriorates, power consumption caused by irradiation of the pattern light can be reduced, and a driving time of the robot 100 can increase. However, when there is no shortage of power, the process proceeds to step S34.

Further, in step S34, it is determined that the temperature inside the pattern irradiation unit 114 or the robot 100 is higher than a predetermined temperature. When the detected temperature is higher than the predetermined temperature, in step S41, the light-off process of the pattern light is executed. As a result, it is possible to prevent an issue caused when the temperature inside the pattern irradiation unit 114 or the robot 100 is higher than the predetermined temperature. However, when the inside temperature is not higher than the predetermined temperature, the process proceeds to step S35.

Further, in step S35, it is determined whether or not the continuous operation time of pattern light irradiation by the pattern irradiation unit 114 is longer than a predetermined time. When the continuous operation time is longer than the predetermined time, in step S41, the light-off process of the pattern light is executed. As a result, the lifespan of a lamp of the pattern irradiation unit 114 such as a light emitting diode (LED) can increase. However, when the continuous operation time is not longer than the predetermined time, the process proceeds to step S36.

Then, the three-dimensional shape or position of the target object can be recognized by three-dimensional measurement, and in step S36, it is determined whether or not the three-dimensional measurement has been completed. When the three-dimensional measurement has been completed, since irradiation of the pattern light is unnecessary, in step S41, the light-off process of the pattern light is executed. However, when the three-dimensional measurement has not been completed, the irradiation intensity of the pattern light is adjusted.

First, in step S37, it is determined whether or not the stereo reliability is lower than a predetermined value and so insufficient. Here, the predetermined value is lower than the predetermined value in step S23 illustrated in FIG. 5. When the stereo reliability is insufficient, in step S38, the irradiation intensity of the pattern light is increased. As a result, since the stereo image generated from the acquired image becomes more vivid, the reliability of the stereo image may be improved. However, when the stereo reliability is not insufficient, the irradiation intensity does not increase, and in step S42, the irradiation process is executed at the current intensity.

Next, in step S39, it is determined whether or not the irradiation intensity of the pattern irradiation unit 114 has become maximum as a result of increasing the irradiation intensity of the pattern light. When the irradiation intensity of the pattern irradiation unit 114 has become maximum, for example, it is a case in which the target object could not be recognized even though the irradiation intensity was gradually increased, and in step S41, the light-off process of the pattern light is executed. However, when the irradiation intensity of the pattern irradiation unit 114 has not become maximum, it is a case in which the irradiation intensity has been appropriately adjusted, and in step S42, the irradiation process of the pattern light is executed.

As described above, the robot 100 of the present embodiment can switch turning on or off the pattern light according to the situation in view of the case in which the pattern light is inhibited from being constantly irradiated or the case in which irradiation of the pattern light is unnecessary so that the robot 100 can be user-friendly, for example, for use in a home.

It is necessary to turn on the pattern light when the user or the robot 100 determines that three-dimensional measurement is necessary, when the stereo reliability is low since the three-dimensional shape is not appropriately measured, or when the subject image is not clearly viewed because it is too dark. Further, it is necessary to turn on the pattern light even when the object has previously been present in the irradiation direction of the pattern light corresponding to the stored data or when the object has been detected by another sensor (for example, the distance sensor unit 118). In the above-described situations, the pattern light is preferably irradiated.

Meanwhile, as described above, when the three-dimensional shape has already been detected, when the pattern light has been irradiated but the target object has not been recognized, or when the pattern of the pattern light becomes unpleasant to the user around it, the pattern light need not be turned on, or it is desirable not to turn on the pattern light. Further, when there is a shortage of battery power, when the temperature of the pattern irradiation unit 114 is high, or when the continuous operation time of the pattern irradiation unit 114 is long, it is preferable not to turn on the pattern light. Under these conditions, the pattern light is preferably turned off.

Further, as described above, when safety needs to be secured or when object recognition for detecting the texture or color is being performed, if a person is around the pattern irradiation unit 114 of the robot 100, turning on the pattern light should forcibly be stopped. Under these conditions, the pattern light is turned off.

It should be understood by those skilled in the art that various modifications, combinations, sub-combinations and alterations may occur depending on design requirements and other factors insofar as they are within the scope of the appended claims or the equivalents thereof.

For example, in the above-described embodiments, a wavelength of the pattern light is not limited, but the present invention can be similarly applied even when a wavelength of a range invisible to human eyes such as infrared rays is used. The infrared rays may be irradiated using an infrared light emitting diode (LED). The infrared rays do not become unpleasant to the user, and the pattern of the infrared rays is recognized by a charge coupled device (CCD) image sensor. However, the infrared rays have a merit that influence in object recognition for recognizing the texture or color is small compared to pattern light of visible light. Therefore, it is expected that conditions in which the pattern light is not allowed to be turned on can be reduced. Since the infrared rays are not bright and thus the iris does not close, even the infrared rays are preferably set to the same condition as in the above described embodiment.

Further, the above described embodiment has been described in connection with the case in which the robot 100 acquires the stereo image by the stereo camera 112, but the present invention is not limited to the example. For example, the present invention can be applied to a technique in which the robot 100 performs triangulation using the infrared LED and the camera. For example, in the case of detecting a person's face, if a person is too close to a light source that is the infrared LED, irradiation of the infrared LED is forcibly stopped.

The present application contains subject matter related to that disclosed in Japanese Priority Patent Application JP 2010-075334 filed in the Japan Patent Office on Mar. 29, 2010, the entire content of which is hereby incorporated by reference.

What is claimed is:

1. A robot device comprising:
one or more processors operable to:
cause irradiation of pattern light to an external environment;
acquire an image by imaging the external environment;
recognize the external environment;
turn on the pattern light when it is determined that the irradiation of the pattern light is necessary based on an acquisition status of the image;
recognize a texture or a color of a target object from the external environment; and
turn off the pattern light when it is determined that the irradiation of the pattern light is required to be stopped based on a temperature of an irradiation unit that irradiates the pattern light and when the texture or the color of the target object has been recognized from the external environment,
wherein the acquisition status indicates a status of the target object in the image.

2. The robot device according to claim 1, wherein the one or more processors are operable to:
detect a person from the external environment, and
turn off the irradiation of the pattern light when the person has been detected.

3. The robot device according to claim 1, wherein the one or more processors are operable to turn off the pattern light when it is determined that the irradiation of the pattern light is unnecessary or that the irradiation of the pattern light is required to be stopped based on an internal status.

4. The robot device according to claim 1, wherein the one or more processors are operable to turn off the pattern light when it is determined that the irradiation of the pattern light is unnecessary or that the irradiation of the pattern light is required to be stopped based on one or more of: power consumption of a battery, or a continuous operation time of the irradiation unit.

5. The robot device according to claim 1, wherein the one or more processors are operable to turn off the pattern light when it is determined that the irradiation of the pattern light is unnecessary or that irradiation of the pattern light is required to be stopped based on the acquisition status of the image.

6. The robot device according to claim 1, further comprising a storage unit operable to store the status, such as a shape or a position, of the target object recognized based on the image, wherein the one or more processors are operable to turn on the pattern light when it is determined that irradiation of the pattern light is required based on the shape or the position of the target object stored in the storage unit.

7. The robot device according to claim 1, wherein the one or more processors are operable to measure a distance from the target object.

8. The robot device according to claim 1, wherein the one or more processors are operable to determine a brightness level of the acquired image.

9. The robot device according to claim 1, wherein the one or more processors are operable to determine a reliability of the acquired image.

10. A method of controlling a robot device, comprising:
irradiating pattern light to an external environment;
acquiring an image by imaging the external environment;
recognizing the external environment;
turning on the pattern light when it is determined that the irradiation of the pattern light is necessary based on an acquisition status of the image;
recognizing a texture or a color of a target object from the external environment; and
turning off the pattern light when it is determined that the irradiation of the pattern light is required to be stopped based on a temperature of an irradiation unit that irradiates the pattern light and when the texture or the color of the target object has been recognized from the external environment, wherein the acquisition status indicates a status of a target object in the image.

11. The method according to claim 10, wherein the determination that the irradiation of the pattern light is required to be stopped is based on one or more of: power consumption of a battery, or a continuous operation time of the irradiation unit.

12. The method according to claim 10, further comprising adjusting intensity of the irradiation of the pattern light based on a predefined parameter.

13. The method according to claim 10, further comprising recognizing the texture or the color of the target object from the acquired image.

14. The method according to claim 10, further comprising storing the status, such as a shape or a position, of the target object recognized based on the acquired image.

* * * * *